July 6, 1943.  H. S. EBERHARD  2,323,384
TRANSMISSION
Filed Nov. 26, 1940  6 Sheets-Sheet 1

INVENTOR
Harmon S. Eberhard
BY
ATTORNEY

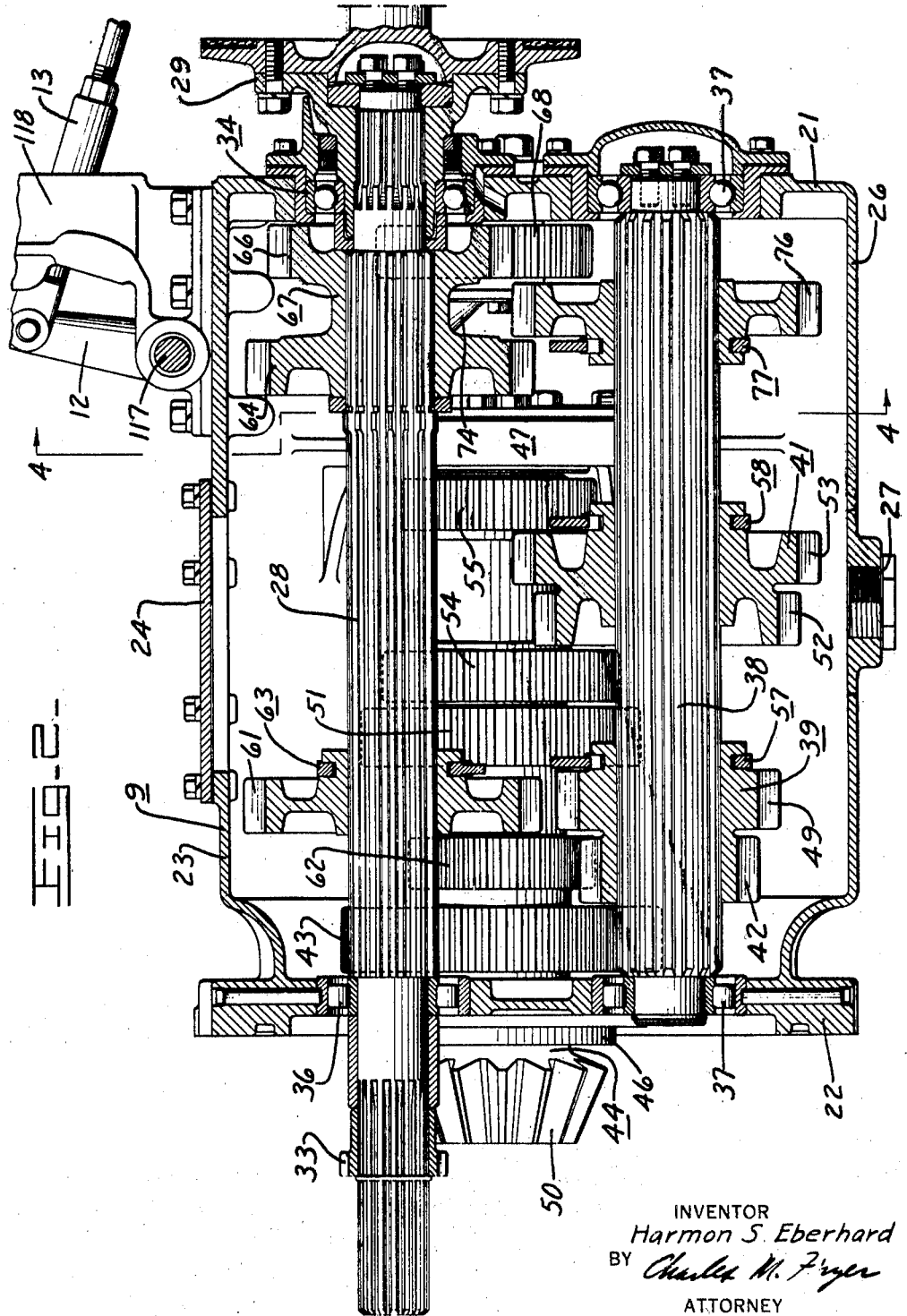

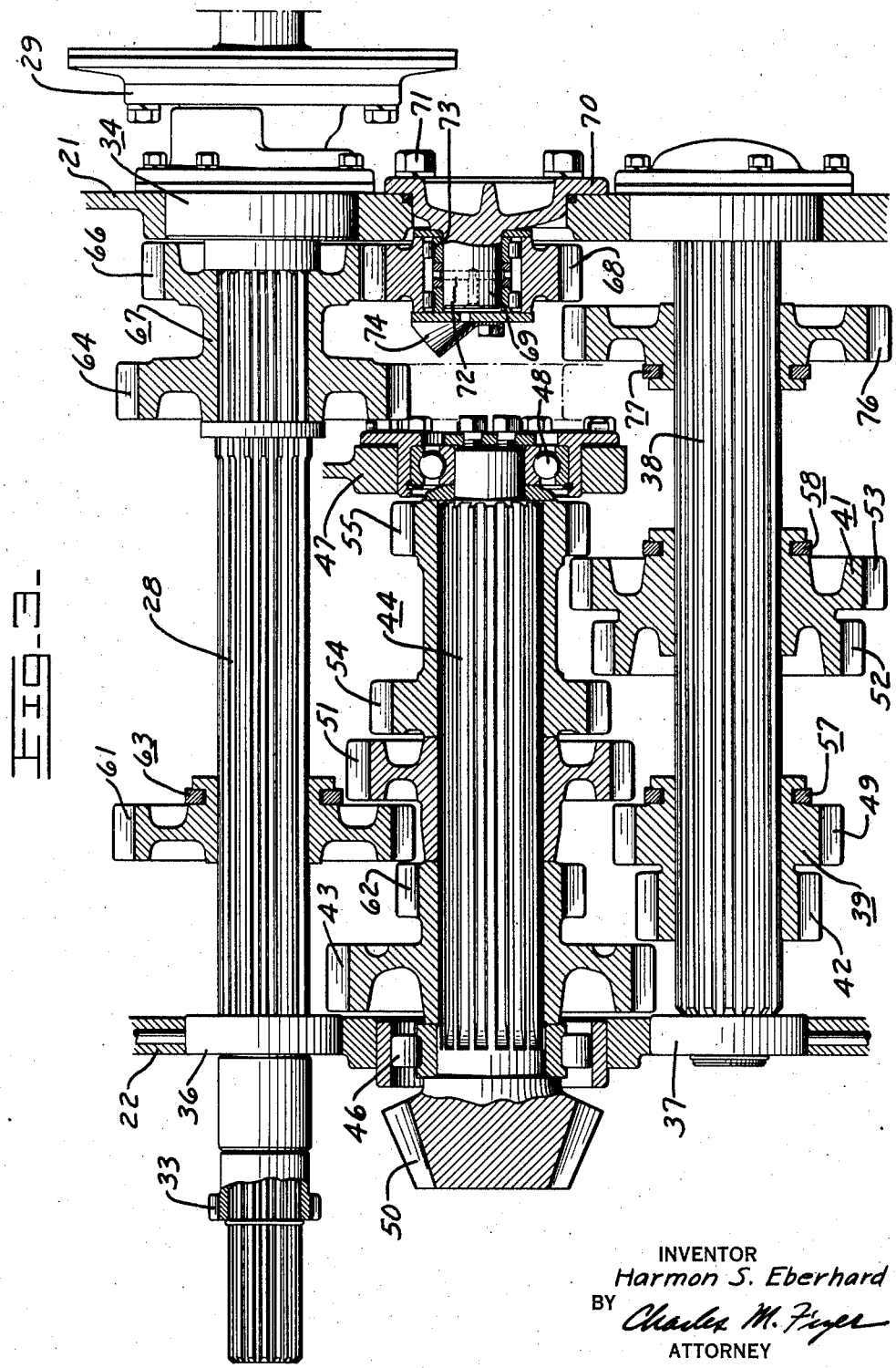

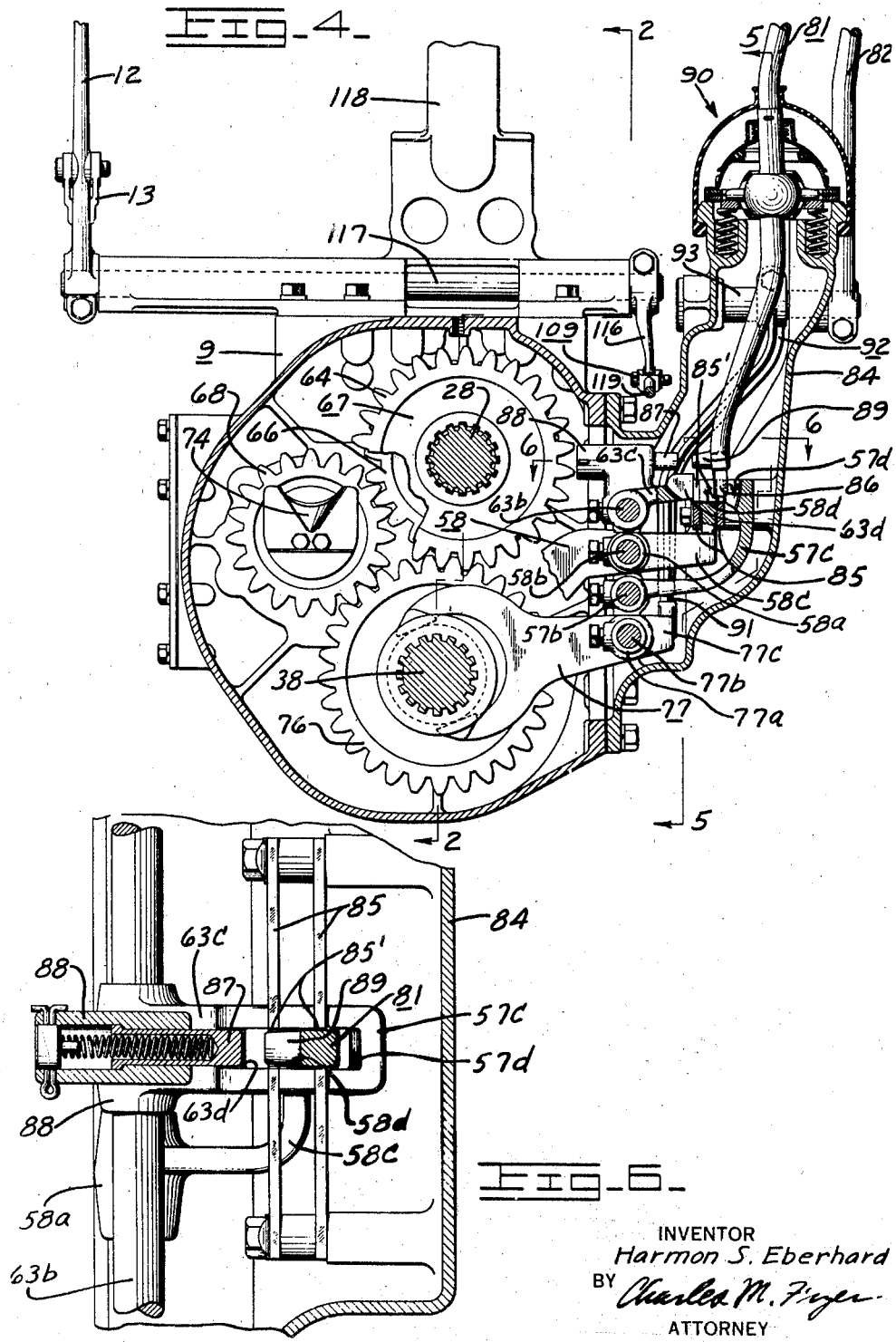

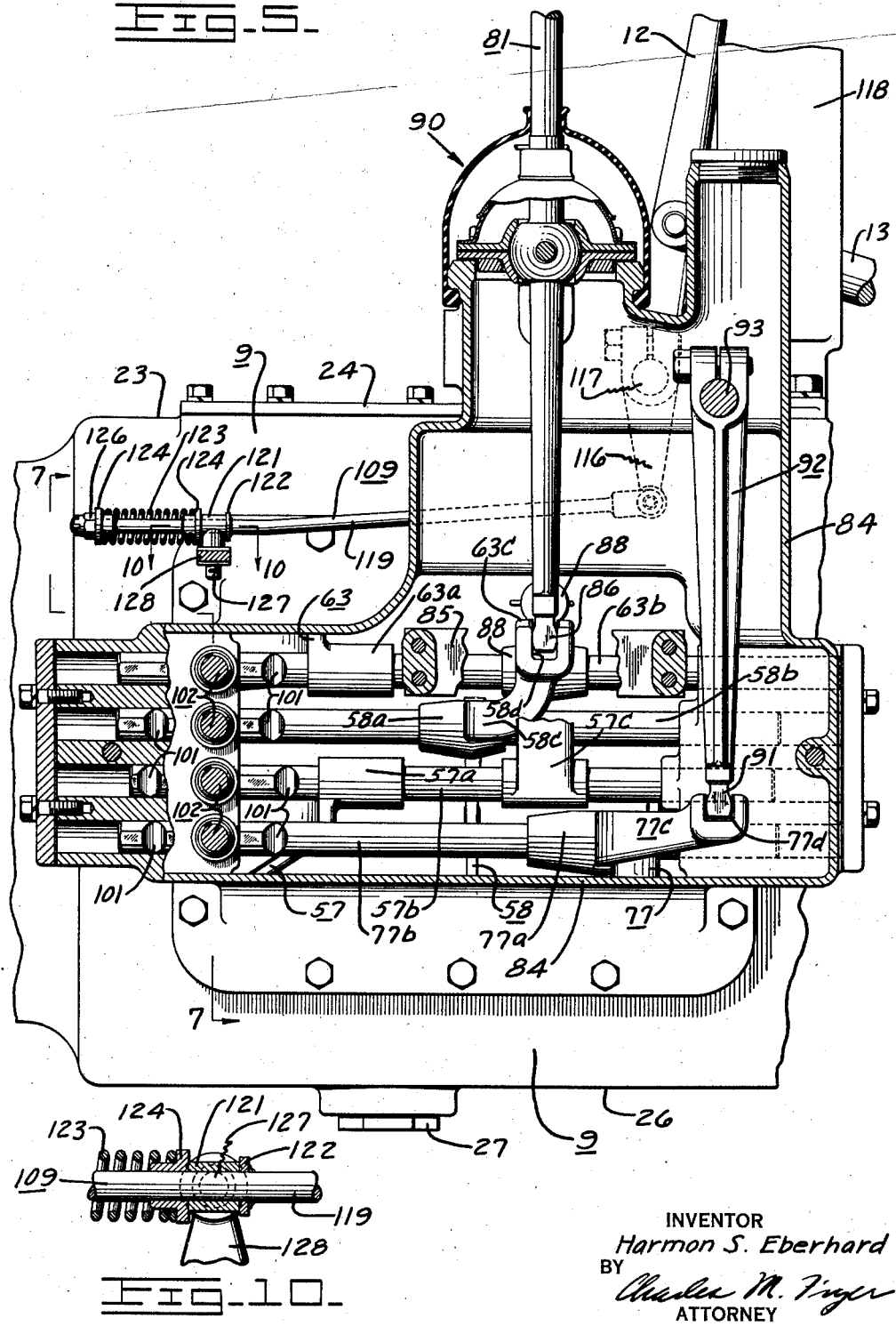

July 6, 1943.  H. S. EBERHARD  2,323,384
TRANSMISSION
Filed Nov. 26, 1940   6 Sheets-Sheet 6
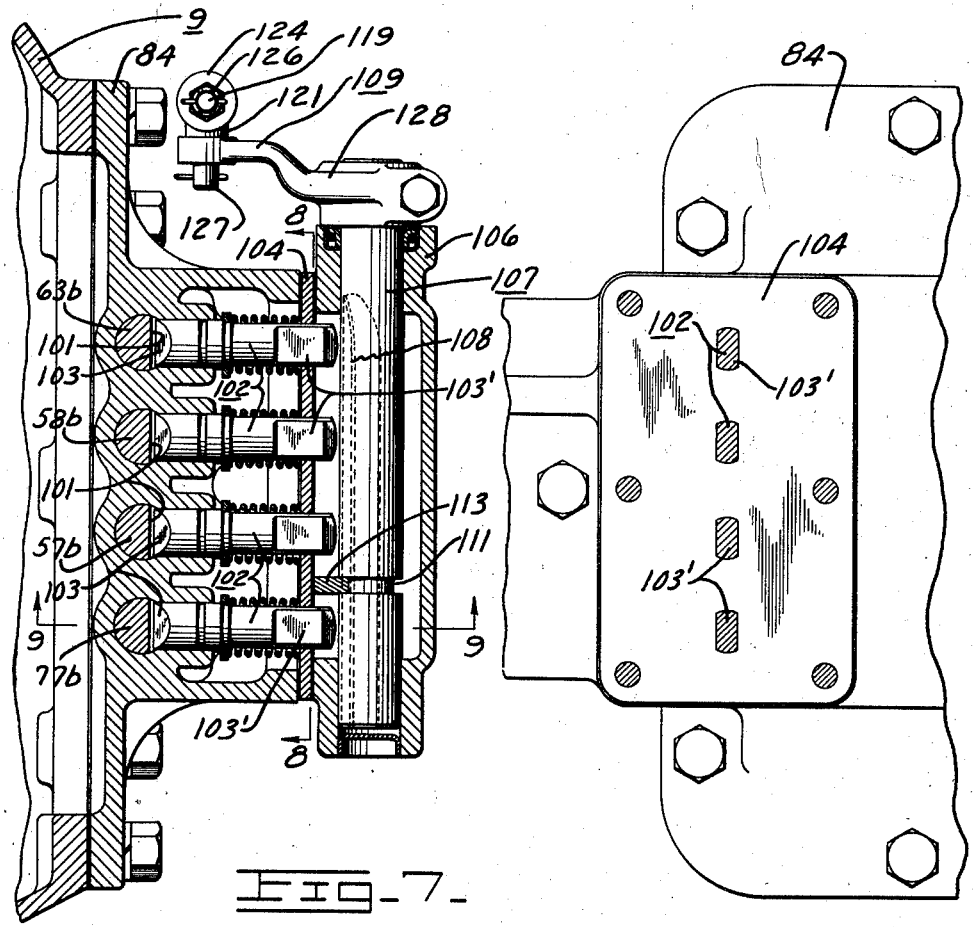
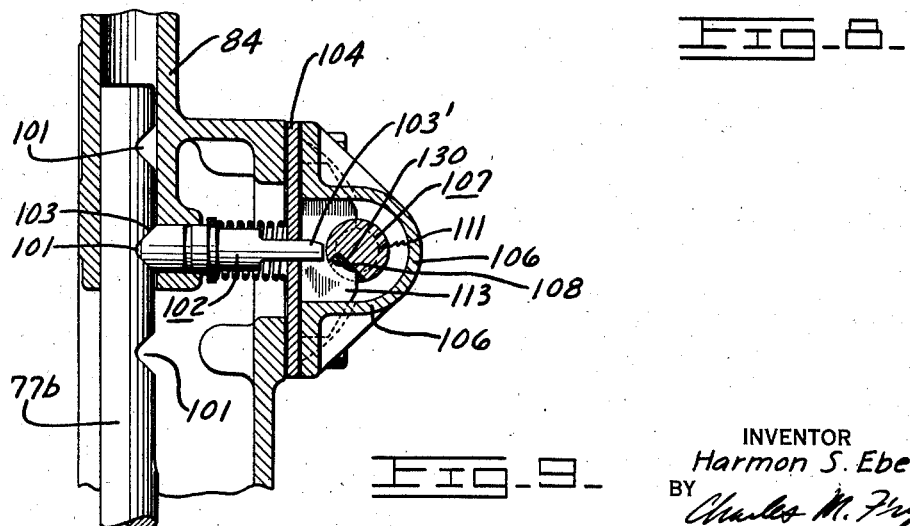
INVENTOR
Harmon S. Eberhard
BY
ATTORNEY Patented July 6, 1943

2,323,384

UNITED STATES PATENT OFFICE 2,323,384

TRANSMISSION

Harmon S. Eberhard, Peoria, Ill., assignor to Caterpillar Tractor Co., San Leandro, Calif., a Corporation of California Application November 26, 1940, Serial No. 367,237

2 Claims. (Cl. 74—342)

My invention relates to transmissions, and more particularly to speed change transmissions adapted for vehicles such as tractors.

With respect to vehicles which are called upon to be driven alternately forwardly and backwardly, such as track-type tractors when performing bulldozing work, it is desirable that reversal of the drive of the tractor after it has been driven forwardly or backwardly be accomplished with ease and rapidity to facilitate the work of the operator, and also save time thereby making for economy. In this connection, bulldozing work comprises employing a bulldozer blade at the front end of the tractor which is utilized to push earth to a desired location when the tractor is driven forwardly. When such position is reached, the operator has to reverse the tractor without a load to line it up for subsequent pushing of more earth to the desired location. This necessitates constant forward and reverse driving of the tractor.

My invention has as its objects, among others, the provision of an improved speed change transmission which is of such character as to enable with ease and rapidity, reversal of the drive of a vehicle after it has been driven forwardly or backwardly; which provides a common reversible drive for any one of a plurality of different speed drives thus obviating the necessity of having to change such different speed drives when the direction of travel of the vehicle is to be reversed; which has reversible gearing so located with respect to selective speed change gearing of the transmission as to enable wide variation in the speed of the drive by merely changing the ratio of the reversible gearing; and which is of economical and simple construction. Other objects of my invention will become apparent from a perusal of the following description thereof.

In the drawings:

Fig. 2 is a vertical longitudinal sectional view of the transmission, taken in a plane indicated by line 2—2 in Fig. 4.

Fig. 3 is a developed view of the transmission shafts and gearing showing the relative relationship therebetween.

Fig. 4 is a vertical transverse sectional view taken in a plane indicated by line 4—4 in Figs. 1 and 2.

Fig. 5 is a vertical longitudinal sectional elevation of the transmission control mechanism, taken in planes indicated by line 5—5 in Fig. 4.

Fig. 6 is a horizontal section taken in a plane indicated by line 6—6 in Fig. 4.

Fig. 7 is a fragmentary transverse vertical sectional view taken in planes indicated by line 7—7 in Fig. 5.

Fig. 8 is a section taken in a plane indicated by line 8—8 in Fig. 7.

Fig. 9 is a section taken in a plane indicated by line 9—9 in Fig. 7.

Fig. 10 is a section taken in a plane indicated by line 10—10 in Fig. 5.

Figure 1:
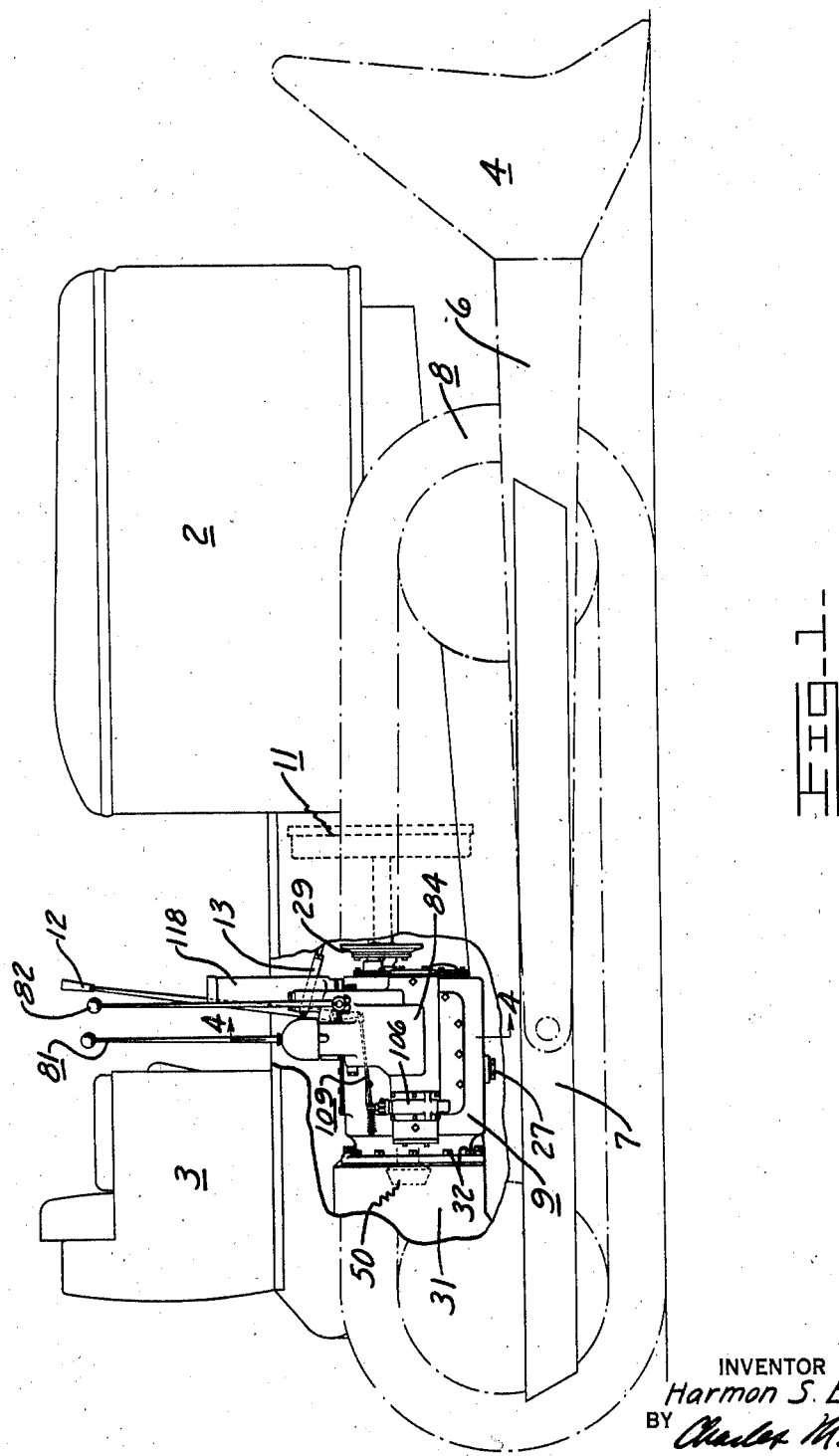
Fig. 1 is a more or less schematic side elevational view of a track-type tractor having a bulldozer blade mounted thereon, with parts shown broken away to illustrate the location of the speed change transmission of my invention.

With reference to Fig. 1, the transmission of my invention is shown in a track-type tractor wherein it has particular applicability because of the nature of the work which such tractor is often called upon to perform. However, such transmission may be employed in any other environment requiring frequent reversal of the drive transmitted thereby. The track-type tractor comprises a tractor body having thereon engine 2, and operator's seat 3 in back of the engine and adjacent the rear of the tractor. A bulldozer blade 4 is mounted at the front of the tractor, and is connected thereto by means including struts 6 secured to truck frames 7, one at each side of the tractor. Each truck frame forms part of an endless track mechanism 8 which provides the ground engaging driving means for the vehicle.

The drive from engine 2 is transmitted to the endless track mechanisms 8 through the speed change transmission gearing of my invention, which is in a detachably mounted unitary transmission case 9; such speed change transmission gearing being connectable at will to the engine by master clutch mechanism 11 of any suitable construction and which is adapted to be engaged or disengaged by clutch control lever 12 connected to the clutch through linkage 13. Control lever 12 is located at the operator's station in front of operator's seat 3 so as to be readily accessible to the operator.

Case 9 includes front end wall 21, rear end wall 22, top wall 23 having removable inspection cover 24 thereon, and bottom wall 26 having lubricant drain plug 27 screwed therein. Power from the engine is transmitted to the transmission when the master clutch is engaged and the engine is operating, by splined driving shaft 28 which is journalled in and extends through end walls 21 and 22 of the transmission case, and which in front of front wall 21 is provided with a detachable coupling 29 to enable the entire transmission case and the gearing contained therein to be mounted and detached as a unit. In this connection, the rear end wall 22 of the transmission case is detachably connected to final drive and steering clutch case 31 of the tractor by screws or studs 32. The rear end of driving shaft 28 which projects beyond rear end wall 22 of case 9, is splined to provide for the usual power take-off for diving auxiliary equipment which may be associated with the tractor, and has secured thereto a pinion 33 connected to drive hydraulic steering clutch control mechanism (not shown). A suitable detachable bearing and seal structure 34 provides a journal and sealing means between the front end of driving shaft 28 and front wall 21; while a suitable bearing 36 provides a journal for the rear end of driving shaft 28 in rear wall 22.

Below driving shaft 28 and journalled in walls 21 and 22 through suitable bearings 37, is a splined countershaft 38 which has a rear cluster gear 39 and a front cluster gear 41 secured for rotation therewith but axially slidable therealong. Rear cluster gear 39 includes a small gear 42 adapted to mesh with a gear 43 fixed for rotation with a splined driven shaft 44 journalled adjacent its rear end in rear wall 22 of the transmission case by means of bearing 46, and adjacent its front end in a partition wall 47 by bearing 48. A bevel pinion 50 at the rear end of driven shaft 44 transmits the drive from such driven shaft to final drive mechanism (not shown) connected to drive the endless track mechanisms.

Also, included in cluster gear 39 is a larger gear 49 adapted to mesh with a gear 51 also fixed to driven shaft 44. Front cluster gear 41 includes a small gear 52 and a larger gear 53 adapted to mesh respectively with gear 54 and gear 55 fixed to driven shaft 44. Axial displacement of gears 43, 51, 54 and 55 on driven shaft 44 is precluded by virtue of the hubs of such gears being held in abutting relationship between rear wall 22 and partition wall 47. Cluster gear 39 is adapted to be shifted axially in either direction from a neutral position by shift mechanism, to be subsequently described in greater detail, which includes shifting fork 57; and cluster gear 41 is adapted to be similarly shifted by means including shift fork 58.

The described gearing comprises speed change gearing between countershaft 38 and driven shaft 44, which is relatively shiftable to provide a plurality of gear combinations for transmitting any selected one of a plurality of different speed drives through the transmission when countershaft 38 is driven. Low speed obtains when gear 42 meshes with gear 43; second speed when gear 49 meshes with gear 51; third speed when gear 52 meshes with gear 54; and fourth speed when gear 53 meshes with gear 55. A fifth speed may be obtained by a direct drive from the driving shaft 28 to the driven shaft 44, by means of a gear 61 rotatable with and axially slidable along driving shaft 28, and which is adapted to be moved from a neutral position to engage only gear 62 fixed to driven shaft 44. Shift mechanism including fork 63 is provided for shifting gear 61 along driving shaft 28. Although the gear combinations described provide for five different speeds through the transmission, it is apparent that any other number of speeds may be obtained if so desired, by varying the number of gears between countershaft 38 and driven shaft 44, and between driving shaft 28 and driven shaft 44.

Means including reversible gearing interposed in the drive ahead of the speed change gearing associated with countershaft 38 and driven shaft 44, is provided for transmitting a drive from the driving shaft 28 through countershaft 38 to driven shaft 44' and such arrangement of the reversible gearing enables a forward or reverse drive for each of the plurality of combinations of gears between countershaft 38 and driven shaft 44. The reversible gearing comprises a pair of driving gears 64 and 66 within case 9 and which are formed as part of integral cluster gear 67 fixedly secured to driving shaft 28 behind front wall 21 of case 9. Front gear 66, which is smaller than rear gear 64, meshes continuously with an idler gear 68 journalled on trunnion 69 fixed to cover 70 detachably secured to front wall 21 by cap screws 71. Trunnion 69 is provided with lubricant passages 72 to supply lubricant to bearing 73 for gear 68; and a lubricant catch 74 is detachably secured to the rear end of trunnion 69 to receive lubricant for transmission to passages 72.

Below gears 64 and 66 is a gear 76 which is secured for rotation with and axially slidable in either direction along countershaft 38. When moved forwardly, gear 76 is adapted to mesh with idler gear 68; and when moved rearwardly, gear 76 is adapted to mesh with gear 64. Thus, depending upon which of gears 64 and 66, gear 76 meshes with, a forward or reverse drive may be selectively transmitted through countershaft 38 to driven shaft 44 for each of the combinations of gearing between countershaft 38 and driven shaft 44. The forward drive is when gear 76 meshes with idler gear 68; while the reverse drive is when gear 76 meshes directly with gear 64.

Control mechanism including a control lever to be subsequently described in greater detail and which is independent of a control lever for shifting the gearing between countershaft 38 and driven shaft 44, is provided for shifting gear 76 through a shifting fork 77 connected to such gear. Hence, when gear 61 is not meshed with gear 62 and the master clutch is disengaged, the drive of the tractor may be rapidly and easily reversed for each of the four speeds between countershaft 38 and driven shaft 44, without changing the relationship of any of the combinations of gearing between such shafts, merely by manipulation of shiftable gear 76. When the transmission is in high or fifth speed, namely, when gear 61 meshes with gear 62, a reverse drive cannot be transmitted. However when traveling in high speed, it is very seldom that the tractor need be reversed because such speed is generally intended for forward travel of the tractor without material load thereon. The character of gears 64 and 76 is preferably such as to provide a faster reverse speed drive for any selected speed drive through the relatively shiftable gearing between countershaft 38 and driven shaft 44, than the forward speed obtained by gears 66, 68 and 76. This makes for economy, because usually in backing up, the tractor is not doing work but merely maneuvering to a position; and it is desirable to get to such position as quickly as possible.

By arranging the reversible gearing 64, 66, 68 and 76 in the transmission drive ahead of the relatively shiftable speed change gearing, an advantageous arrangement obtains enabling wide variations in the speed drive that may be transmitted through the various combinations of such relatively shiftable gearing, merely by providing various combinations of gears 64, 66, 68 and 76, and employing the desired combination upon installation of such gears. Thus, the transmission is adapted for transmission of a large number of varying speeds without changing any of the relatively shiftable speed change gearing.

Shift means of any suitable construction is provided, including a single gear shift lever 81, for shifting any one of gear 61, cluster gear 39 comprising gears 42 and 49, or cluster gear 41 comprising gears 52 and 53; and a single auxiliary shift lever 82 is provided for shifting gear 76.

The form of means descrbed herein comprises shifting fork 57 for cluster gear 39, which has an extension hub 57a fixedly secured to axially slidable shift shaft 57b; shifting fork 58 for cluster gear 41, which has extension hub 58a secured to axially slidable shift shaft 58b; shifting fork 63 for gear 61, which has an extension hub 63a secured to axially slidable shift shaft 63b; and shifting fork 77 for gear 76 which has an extension hub 77a secured to axially slidable shift shaft 77b. Shift shafts 57b, 58b, 63b and 77b are all mounted in an extension control housing 84 fixedly attached to a side of case 9; and shafts 57b, 58b and 63b have respectively fixedly secured thereto, as can be observed more clearly from Figs. 4 and 5, arms 57c, 58c and 63c which have respectively in their upper ends slots 57d, 58d and 63d. The central one of these arms 58c is adapted to slide between spaced guides 85 fixed to extension control housing 84 and having opposite slots 85'; and in the neutral position of arms 57c, 58c and 63c, namely when none of the gears associated therewith is engaged, the slots 57d, 58d and 63d are in transverse alignment with each other and with the slots in guides 85. Hence, the lower end 86 of speed change gearing shift lever 81 can be moved into engagement with any one of slots 57d, 58d and 63d, to enable the associated shift arm to be moved in opposite directions, for effecting corresponding shifting of the gearing associated therewith.

Should end 86 of shift lever 81 be in such position that it engages in both of adjacent slots 57d and 58d, or 58d and 63d, it will be apparent that the guide 85 between such adjacent slots will preclude movement of lever 81, to thereby obviate damage which might occur by simultaneous shifting of more than one shift arm. When end 86 of gear shift lever 81 engages in slot 63d for shifting of gear 61, the fifth or high speed position obtains, as was previously related. In such position, gear shift lever 81 is adapted to be thrust against a spring pressed plunger 87 slidably mounted in a bracket 88 fixed to shift shaft 63b and integral with arm 63c. A laterally projecting boss 89 may be provided on lever 81 adjacent end 86 thereof to engage plunger 87. The purpose of such spring pressed plunger 87 is to indicate to the operator when the transmission gearing is being shifted to high speed position; as the resistance which such spring pressed plunger offers against the lower end of shift lever 81 requires more effort on the part of the operator to shift into high speed position than into the other transmission speed positions. Any suitable universal ball and seal structure 90 may be provided to enable universal shifting movement of lever 81 so that it may be moved in opposite directions and the lower end 86 thereof engaged in any of slots 57d, 58d and 63d.

For the shifting of gear 76 to provide for either forward or reverse drive, the hub 77a associated with shifting fork 77 and which is fixed to shift shaft 77b, has fixed thereto an arm 77c having a slot 77d which opens upwardly and in which is always engaged the lower end 91 of a lever 92 fixedly secured to rock shaft 93 journalled in the upper part of extension housing 84. Shift lever 82 is fixedly secured to rock shaft 93 outside of housing 84; and hence forward or backward movement of auxiliary shift lever 82 will effect movement of gear 76 for connecting it with either of driving gears 66 or 64.

Means is provided for preventing shifting of any of the gears when master clutch mechanism 11 is engaged, to thereby preclude damage to the transmission gearing which might otherwise occur should the operator inadvertently attempt to shift any of the gearing while the master clutch is engaged and a drive is transmitted to the transmission through driving shaft 28. As can be observed more clearly from Figs. 5, 7 and 9, each of shift shafts 58b, 57b and 77b is provided with three wedge-shaped recesses or notches 101, each of which is adapted to receive in latching engagement an associated spring loaded plunger 102 having wedge-shaped end 103; while shift shaft 63b for shifting gear 61 has a pair of such wedge-shaped notches 101 each of which is adapted to receive in latching engagement a wedge-shaped end 103 of a similar associated plunger 102.

The central one of notches 101 on each of shift shafts 58b, 57b and 77b, is adapted to receive the associated plunger 102 in the neutral position of the gearing associated with such shift shaft to latch such gearing in neutral; and the end notches on each of such shift shafts are adapted to receive the associated plunger 102 when the shift shaft is shifted in either one of opposite directions from the neutral position to mesh the gearing associated therewith, whereby such gearing is latched in all of their meshed positions. Because of the wedge-shaped character of notches 101 and plunger ends 103, the shift shafts may be readily shifted into and out of latching engagement with plungers 102. Fifth speed gear 61 is shiftable from neutral position to mesh with only one gear 62. This is why only two notches 101 need be employed on shift shaft 63b associated with gear 61. One of such notches engages the associated plunger 102 to latch gear 61 in neutral position; and the other notch engages plunger 102 to latch gear 61 when it meshes with gear 62.

Locking means is also provided to lock the various plungers 102 when they are in proper engagement in notches 101 and preclude shifting of the gearing when the master clutch is engaged. The ends 103' of plungers 102 opposite wedge-shaped ends 103 thereof project through a plate 104 clamped against extension housing 84 by means of a cap 106 which has journalled therein a locking shaft 107 provided with an axially extending recess 108 in its periphery. Such ends 103' are flat sided; and the recesses in plate 104 through which ends 103' project have a complementary shape to preclude turning of plungers 102. Locking shaft 107 is so connected with master clutch control lever 12 through linkage 109, that when the master clutch is engaged, recess 108 is out of line with the ends 103' of plungers 102. Consequently, the shiftable gearing cannot be moved when the master clutch is engaged because should attempt be made to move any of shift shafts 63b, 58b, 57b or 77b axially, the wedge-shaped ends 103 of plungers 102 cannot be moved out of notches 101 inasmuch as ends 103' of plungers 102 would strike against the unrecessed portion of locking shaft 107. However, when the master clutch is disengaged, locking shaft 107 is moved through linkage 109 to the position where recess 108 therein is opposite the ends 103' of plungers 102. Hence, any of the shift shafts 63b, 58b, 57b and 77b, may be shifted in any desired direction only when the master clutch is disengaged; and when the gearing associated with any of such shift shafts is properly engaged and the master clutch is re-engaged, such gearing will be locked in proper position. For preventing axial displacement of locking shaft 107, it is provided with a peripheral groove 111 in which is engaged a plate 113 fixedly mounted in cap 106.

The control linkage 109 connecting locking shaft 107 to master clutch control lever 12 comprises arm 116 fixedly secured to one end of a rock shaft 117 journalled in bracket 118 mounted on the top of case 9; and at its opposite end, rock shaft 117 is connected to the lower end of lever 12. At its lower end, arm 116 is pivotally connected to a rod 119 which extends rearwardly through a collar 121 loosely mounted thereon but which is adapted at one end thereof to abut an abutment 122, fixed to such rod 119 and which may be conveniently secured by welding it to rod 119. Collar 121 is spring thrust against abutment 122 by spring 123 about the projecting end of rod 119 and which is interposed between a pair of spring retainers 124, one of which abuts collar 121 and the other one of which abuts spring pressure adjusting nut 126 fixed to the end of rod 119. Collar 121 has a laterally projecting pin 127 which is pivotally connected to lever 128 fixedly attached to an end of locking shaft 107 which projects laterally beyond cap 106.

To disengage master clutch mechanism 11, lever 12 must be moved to the right as it appears in Fig. 5. Such movement results in movement of rod 119 to the left with the result that abutment 122 will cause movement of collar 121 to the left with consequent movement of locking shaft 107 to the position where recess 108 is opposite ends 103' of locking plungers 102; and the gearing which is intended to be shifted by manipulation of either one or both of levers 81 and 82 may be so shifted. If the gearing shifted is properly meshed, the master clutch can be re-engaged by movement of lever 12 to the left, as it appears in Fig. 5. This results in locking shaft 107 being moved to locking position through a follow up action of spring 123.

In effecting such shifting of the desired gearing, it is apparent that the proper shifted position thereof can only obtain when wedge-shaped end 103 of an associated plunger 102 is properly engaged in a notch 101. Should such engagement not occur, and should the operator move control lever 12 to re-engage the master clutch after it has been disengaged for the shifting of gearing, movement of locking shaft 107 will be precluded because then end 103' of such plunger 102 will strike a straight side 130 which bounds recess 108 in locking shaft 107. If the operator were to force lever 12 to engage the master clutch under such circumstances, damage to the transmission might very readily occur. However, during such re-engagement of the clutch, rod 119 must be moved against the action of spring 123; and should any of plungers 102 be improperly positioned, spring 123 will be compressed to enable the operator to tell by the feel of lever 12 that the transmission is improperly meshed. Thus, spring 123 provides a yieldable connection in the control linkage 109, which indicates to the operator when the locking shaft 107 is in improper engagement with locking plungers 102 during establishment of a drive through the transmission, and which hence precludes damage to the transmission.

I claim:

1. In a transmission, a driving shaft, a driven shaft, a countershaft, relatively shiftable speed change gearing associated with said driven shaft and said countershaft to provide a plurality of gear combinations for transmitting any selected one of a plurality of different speed drives through said transmission, relatively shiftable speed change gearing associated with said driving shaft and said driven shaft for transmitting a drive directly from said driving shaft to said driven shaft, and reversible gearing between said driving shaft and said countershaft for selectively establishing either a forward or reverse drive for each of said gear combinations associated with said driven shaft and said countershaft.

2. In a transmission, a case, a driving shaft journalled in said case, a driven shaft journalled in said case, a countershaft journalled in said case, gearing within said case fixed to said driven shaft, gearing within said case rotatable with but axially shiftable along said countershaft and cooperable with certain of said driven shaft gearing to provide a plurality of gear combinations for transmitting any selected one of a plurality of different speed drives through said transmission, other gearing within said case rotatable with but axially shiftable along said driving shaft and cooperable with other of said driven shaft gearing to transmit a drive directly from said driving shaft to said driven shaft, and reversible gearing within said case between said driving shaft and said countershaft for selectively establishing either a forward or reverse drive for each of said gear combinations between said driven shaft and said countershaft.

HARMON S. EBERHARD.